CIRCUITS EMPLOYING NEGATIVE RESISTANCE ELEMENTS

Filed Oct. 2, 1959 4 Sheets-Sheet 1

INVENTOR.
KAM LI
BY John V. Regan
ATTORNEY

CIRCUITS EMPLOYING NEGATIVE RESISTANCE ELEMENTS

Filed Oct. 2, 1959 4 Sheets-Sheet 2

INVENTOR.
KAM LI

BY John V. Regan

ATTORNEY

CIRCUITS EMPLOYING NEGATIVE RESISTANCE ELEMENTS

Filed Oct. 2, 1959 4 Sheets-Sheet 3

INVENTOR.
KAM LI
BY John V. Regan
ATTORNEY

INVENTOR.
KAM LI
BY
John V. Regan
ATTORNEY 3,075,088

CIRCUITS EMPLOYING NEGATIVE RESISTANCE ELEMENTS

Kam Li, Levittown, Pa., assignor to Radio Corporation of America, a corporation of Delaware Filed Oct. 2, 1959, Ser. No. 844,070
18 Claims. (Cl. 307—88.5)

The present invention relates to improved circuits employing "negative resistance" diodes. While not restricted thereto, the invention is especially useful in high speed memories for computers.

The circuit of the present invention includes a first negative resistance diode which is capable of assuming one of two stable voltage states and a second negative resistance diode which is capable of oscillating in response to an applied current of given magnitude. The first diode is connected to the second diode and causes a current of one value to flow through the second diode when the first diode is in one state and a current of another value to flow through the second diode when the first diode is in its other state. To determine the state of the first diode, an additional current is applied to the second diode which, when added to the current applied by the first diode, places the second diode in an oscillating condition when the first diode is in one state, but not when the first diode is in its other state.

The invention will be described in greater detail by reference to the following description taken in connection with the accompanying drawing in which.

Figure 1:
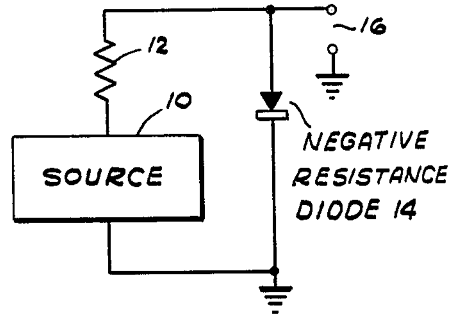
FIG. 1 is a block and schematic circuit diagram of a negative resistance diode circuit which is useful in the explanation of the invention.

A simple circuit employing a negative resistance diode is shown in FIG. 1. It includes a source 10, a resistor 12 in series with the source, and a negative resistance diode 14. Resistor 12 may be a lumped resistor or it may be the internal resistance of source 10 or it may represent both. Source 10 may be either an alternating pulse, or direct-current source depending upon the use to which the circuit is put. In the discussion which follows, the source will be assumed first to be a direct-current source. The output of the circuit is taken at terminal 16.

Figure 2:
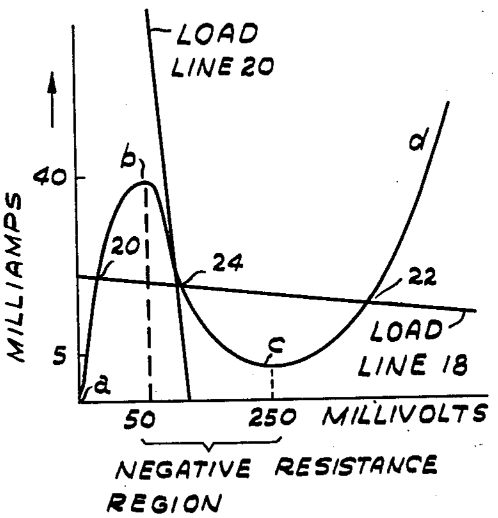
FIG. 2 is a volt-ampere characteristic of the diode of FIG. 1.

The characteristic *abcd* shown in FIG. 2 is the D.C. voltage-current characteristic for diode 14 of FIG. 1. The portions *ab* and *cd* of the curve have a positive resistance. In other words, the change in voltage divided by the change in current is a positive quantity. The portion *bc* of the curve has a negative resistance. As will be explained in greater detail later, when the load line of the circuit crosses a positive and the negative resistance region, the condition corresponding to the negative resistance region is an unstable condition of the diode and the diode assumes a voltage in the positive resistance region. On the other hand, when the load line passes through the negative resistance region without passing through the positive resistance region, the diode acts as a generator and, with appropriate reactances in the circuit, oscillations are produced.

In a practical circuit, resistor 12 may be of relatively large value—at least 10 or so times the resistance of diode 14. The resistance of the diode is low—2 or 3 ohms or less so that the resistor 12 is normally from 30 to several hundred ohms. The load line for the circuit may be as indicated at 18. Its slope and point of intersection with the diode characteristic depend, of course, on the source voltage and the value of resistor 12. The load line intersects the positive resistance regions *ab* and *cd* at 20 and 22 and the negative resistance region at 24.

As is understood in the art, with a load line like 18, the diode of FIG. 1 is capable of assuming one of two stable states. One corresponds to point 20 and the other corresponds to point 22. As these two points are at different voltages, the two stable diode states are termed the "low voltage" and the "high voltage" states, respectively. The low voltage state can represent one binary digit such as binary zero and the high voltage state another binary digit such as binary one. Negative resistance diodes having a characteristic such as that illustrated in FIG. 2, which can assume one of two different values of voltage at a given value of current, are known in this art as "voltage controlled negative resistance diodes."

In a practical circuit, the diode may be switched from one stable state to another by a very short current pulse, as short as 0.1–2 millimicroseconds in duration. A forward bias current pulse can switch the diode from its low (low voltage) stable state to its high (high voltage) stable state, and a reverse bias current pulse can switch the diode from its high to its low state. The voltage across the diode in the two states may be determined from FIG. 2 and, for the specific diode whose characteristic is shown, it may be about 25 millivolts in the low state and roughly 400 millivolts in the high state. It is to be understood that the values of milliamperes and millivolts shown are representative of those which may be found in practice and are not meant to be limiting. The current scale, for example, may be different for diodes of different composition and processing.

With a load line like 18, the negative resistance region *bc* is unstable. However, if one were to use a resistor 12 of sufficiently low value, one would be able to alter the load line so that it passed only through the negative resistance region *bc*. Such a load line is shown at 20 in FIG. 2. With a load line of this type, the diode is capable of oscillating and will do so if appropriate reactance is present in the diode circuit. However, with a diode whose resistance is a few ohms or less, source 10 would have to be of very low internal impedance, of the order of a few ohms or less and of low voltage of the order of 100 millivolts or less. (Resistor 12, in this case, represents this internal impedance.)

A discussion of some of the above and other aspects of negative resistance diodes may be found in an article by H. S. Sommers, Jr., appearing in the Proceedings of the IRE, July 1959, page 1201, titled "Tunnel Diodes as High-Frequency Devices".

Figure 3:
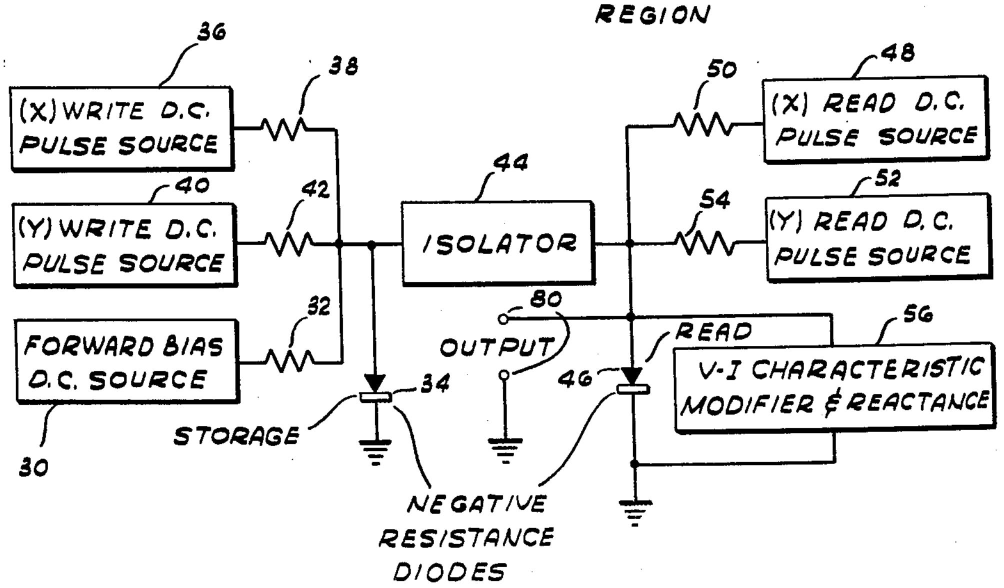
FIG. 3 is a block and schematic circuit diagram of a general form of the present invention.

A circuit according to the present invention is shown in FIG. 3. Direct-current bias source 30 applies a forward bias current through coupling resistor 32 to negative resistance diode 34. X write direct-current pulse source 36 applies direct-current pulses through resistor 38 to the same diode 34. Y write direct-current pulse source 40 applies direct-current pulses through resistor 42 to the same diode 34. Diode 34 may be termed the write or storage diode since it stores a voltage indicative of binary information. We may assume, for example, that when diode 34 is in its low state, it stores the binary digit zero and when it is in its high state, it stores the binary digit one.

Diode 34 is connected through an isolating element or isolator 44 to a second negative resistance diode 46. The latter will hereafter be referred to as a "read diode," as the presence or absence of oscillations across this read diode indicates the binary digit stored in write diode 34.

An *x* direct-current read pulse source 48 is connected through a resistor 50 to diode 46. A *y* read direct-current pulse source 52 is connected through resistor 54 to diode 46.

The voltage-current characteristic of diode 46 is modified from the shape shown in FIG. 2. The means for doing this is illustrated by a single block 56 connected in shunt across the diode. This block also represents a suitable reactance forming an oscillatory circuit with the diode. Details of this block and isolator block 44 are given later.

Figure 4:
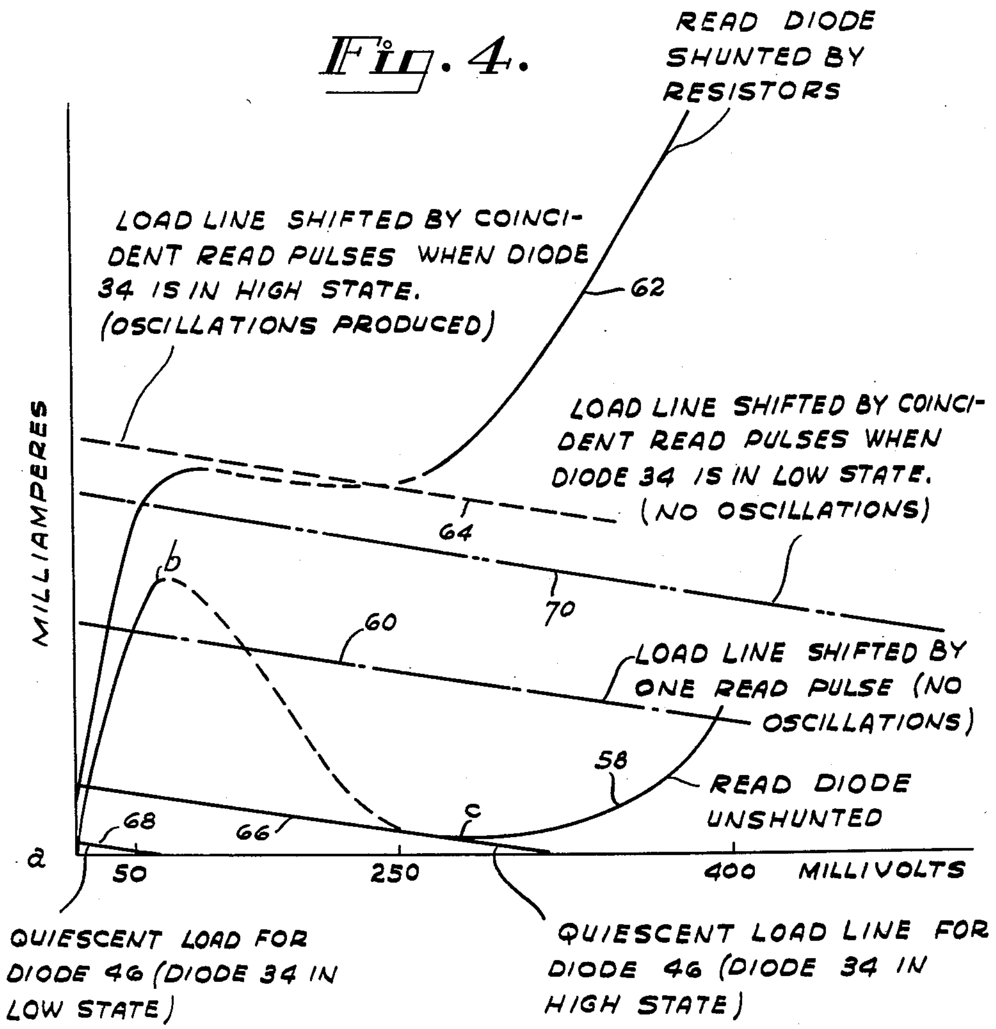
FIG. 4 is a drawing of the volt-ampere characteristic state of one of the diodes shown in FIG. 3.

The voltage-current characteristic of diode 34, and diode 46 in the absence of the circuit represented by block 56, is as shown in FIG. 2 or as shown in greater detail at 58 in FIG. 4. The current scale is not shown since it can be widely different in different diodes, however, values of current for a specific operating circuit will be given later. The negative resistance region for curve 58 is shown by a dashed line because, in the method used to view the characteristic on an oscilloscope, it either does not appear as a trace, or appears as a distorted trace due to the limitations of the measuring equipment employed. The negative resistance region of the particular diode employed extended from about 50 millivolts to about 250–280 millivolts. With a slightly imperfect constant-current source and a load line such as shown at 60, for example, it can be seen that no matter how the position of the load line is varied, it can never pass through the negative resistance region of curve 58 without at the same time passing through a positive resistance region of the curve 58. Thus, with the load line like 60, it is not possible to drive the diode into oscillation.

One way to cause the diode to oscillate is to modify the diode characteristic 58. It is also necessary to place a reactance in circuit with the diode. Block 56 serves these functions. The block may take a number of forms. Assume, for a moment, that the block includes a resistor having a relatively low value—of the same order of magnitude, for example, as the resistance of the diode connected in shunt with the diode. The resultant voltage-current curve for the diode with the shunt resistor is as shown at 62. Again, the negative resistance portion of the characteristic is not observable on the oscilloscope but it is known to be present since, when the load line 60 is shifted to the position indicated at 64, the diode is capable of producing oscillations. This means that the shape of the negative resistance region is now such that the load line is capable of intersecting it without intersecting a positive resistance region of the curve.

The circuit of FIG. 3 operates as follows. Negative resistance diode 34 has a characteristic as is shown at 58. The forward bias, direct-current source 30 applies a direct-current to the diode such that the load line is parallel to load line 60 and passes about half way up the positive resistance portion *ab* of the curve. If two reverse bias pulses are coincidentally applied to the storage diode from sources 36 and 40, their total amplitude is sufficient to place the storage diode in its low state, if it is not already in that state, by "driving" the load line below the minimum point *c* of the curve *abcd*, leaving only one stable point of intersection of load line and curve near *a*. When the load line returns to its quiescent condition, the stable intersection merely moves to a point near midway between *a* and *b* on the curve *abcd* as determined by the bias and the slope of the load line. It will be assumed that this low state corresponds to the binary digit zero. When pulses 36 and 40 apply concurrent forward bias pulses to diode 34, their total amplitude is sufficient to place the diode in its high state in a somewhat similar action this time "driving" the load line over the maximum point *b* of the curve *abcd*, whereupon the circuit stabilizes at the intersection of the load line and the high voltage portion *cd* of the curve *abcd*. It may be assumed that this high state represents the binary digit one.

For the purposes of the present explanation, assume that the first diode 34 is storing the digit one, that is, it is in its high state. In its high state, the voltage across the storage diode may be of the order of 300 or 400 millivolts or so. This voltage causes a quiescent current to pass through isolator 44 and into the read diode 46. Thus, read diode 46 has a quiescent load line as is indicated at 66 in FIG. 4. In order to determine whether the storage diode 34 is storing the binary digit zero or the binary digit one, read pulses are applied from sources 48 and 52. A single read pulse shifts load line 66 to position 60 in FIG. 4. Load line 60 intersects the positive resistance portion of the volt-ampere characteristic 62 of read diode 46. Accordingly, this diode remains in a stable state and does not produce oscillations. However, if two read pulses are applied coincidentally, one from *x* read source 48 and the other from *y* read source 52, they shift the load line from position 66 to position 64. Load line 64 intersects the negative resistance region of curve 62 without intersecting its positive resistance region and, with appropriate reactances present in circuit with new read diode 46, the read diode oscillates. In practice, it has been found that the distributed inductance of the resistor connected across diode 46 to modify its characteristic introduces sufficient inductance for this purpose, and resonates with the distributed circuit capacitance.

Assume now that the binary digit zero is stored in storage diode 34. This means that storage diode 34 is in its low state and there is a voltage of less than 50 millivolts across it. Again, this voltage causes a current to flow through isolator 44 and into diode 46. However, now the current is much smaller and the quiescent load line is as shown at 68 in FIG. 4. Two coincidentally applied read pulses again displace the load line, but the amount it is displaced is insufficient to place it in the negative resistance region of curve 62. Accordingly, the diode does not oscillate. This displaced load line is shown at 70, and it can be seen that the intersection is only with the positive resistance region.

Figure 5:
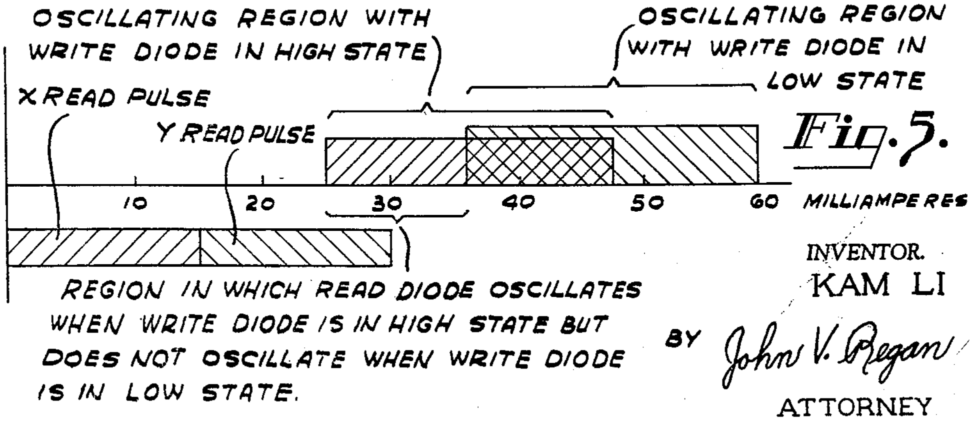
FIGS. 5 and 6 are graphs to explain the operation of the circuit of FIG. 3.

FIG. 5 illustrates some of the current magnitudes involved. The current scale indicates the number of milliamperes required from read sources 48 and 52 to place read diode 46 in an oscillating condition when storage diode 34 is in its low state and in its high state. It may be observed that when the storage diode 34 is in its high state, read diode 46 begins to oscillate at 25 milliamperes from sources 48 and 52 together and stops oscillating at about 48 milliamperes. Correspondingly, with storage diode 34 in its low state, read diode 46 begins oscillating at about 35 milliamperes and stops oscillating at about 60 milliamperes. In the region between 25 and 35 milliamperes, read diode 46 oscillates when storage diode 34 is in the high state but does not oscillate when read diode 34 is in the low state. Accordingly, if the *x* and *y* read pulses are of the order of about 15 milliamperes each, they cause read diode 46 to oscillate when storage diode 34 is in the high state, but not when storage diode 34 is in the low state.

It is assumed in FIG. 5 that the quiescent load line is at zero current. It may be observed in FIG. 4 that this is not the case so that in practice the *x* and *y* read pulses will each be of slightly smaller amplitude than indicated. It should also be appreciated that, if desired, read diode 46 may be separately biased by a D.C. source. In this case *x* and *y* read pulses of still smaller amplitude may be employed. Ordinarily, it is preferred not to use the separate bias source as, without such a bias source, less standby power is dissipated.

The read diode 46 begins to oscillate when the load line passes through the negative resistance region. When the forward bias current is sufficient to drive this negative resistance diode well into the positive resistance region of the high voltage state, the read diode stops oscillating.

Figure 6:
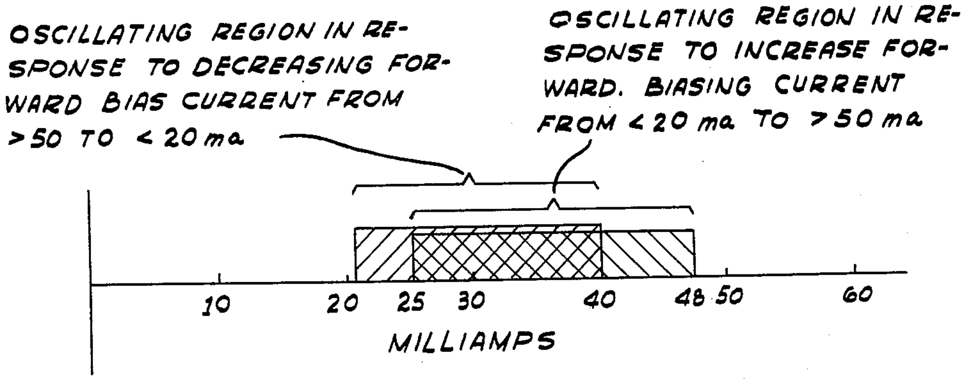

It is believed that once the diode starts oscillating in the negative resistance region, it continues to oscillate even after the load line is moved slightly into a positive resistance region because the peaks of the oscillation cyclically drive the diode into the negative resistance region. This is illustrated in FIG. 6. When the forward bias current through diode 46 is increased from a value of less than 20 milliamperes to a value greater than 50 milliamperes, it is observed that oscillation starts at about 25 milliamperes and stops at about 48 milliamperes. If now the forward bias current is decreased, it is observed that oscillations start at about 40 milliamperes and stop at about 21 milliamperes. Thus, the diode exhibits a certain amount of hysteresis, the reason for which is believed to be the one given above.

Returning for a moment to FIG. 3, the output of diode 46 may be taken from across terminals 80. It is preferred to use a high impedance output circuit to prevent loading the oscillating circuit. Alternatively, an antenna which will not appreciably load the circuit may be employed for receiving radiation from the tuned circuit.

Figures 7, 8, 9:
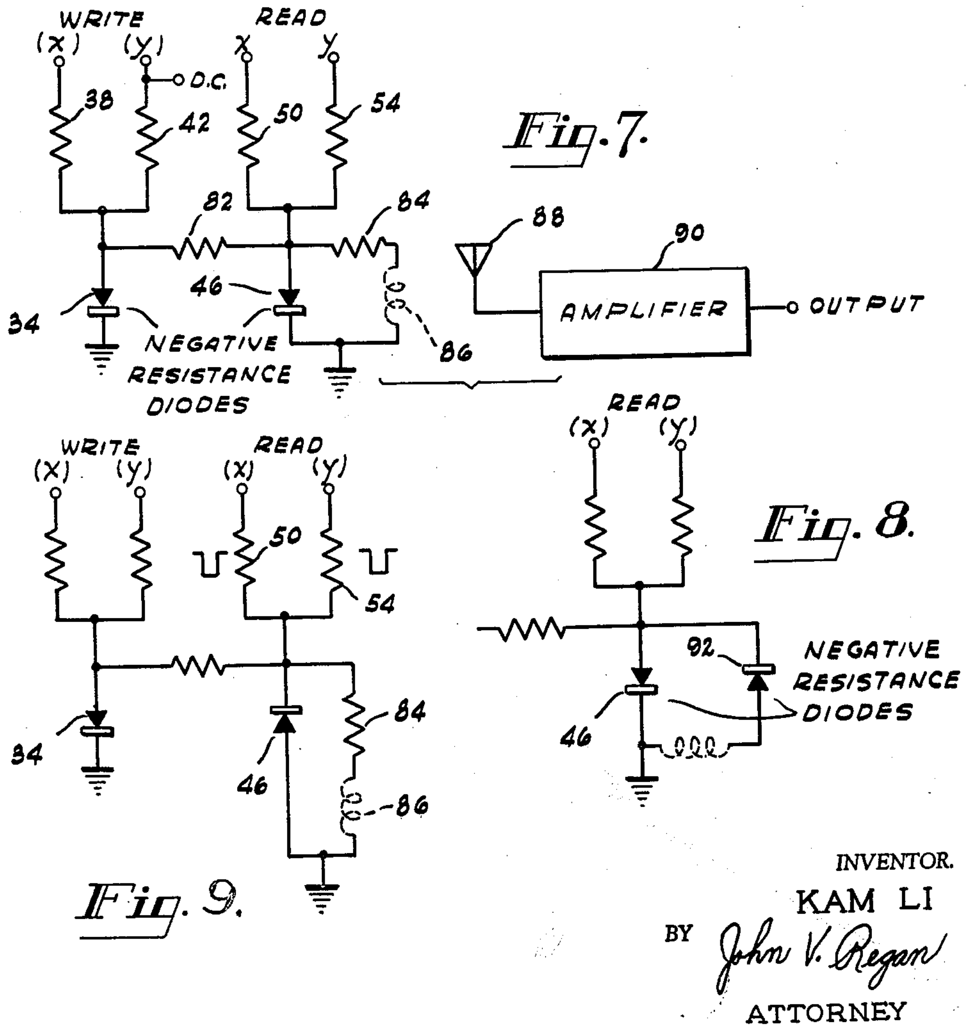
FIGS. 7, 8 and 9 are circuit diagrams of portions of the circuit of FIG. 3 in modified form.

FIG. 7 illustrates a portion of a specific form of the invention. The isolator 44 of FIG. 3 is shown as a resistor 82. The voltage-current characteristic of diode 44 is altered by means of a resistor 84. The reactance required for oscillations is the distributed inductance of the resistor leads. This inductance is illustrated by the dashed inductor 86.

It has been found that when very short leads are used on resistor 84, the output frequency of the circuit, when it oscillates, is relatively high and the wavefore is close to a sine wave. As the leads on resistor 84 are increased in length, the frequency of the circuit decreases and the waveform approaches a pulse waveform. Finally, when the resistor 84 leads are formed into one or more turns, the frequency decreases still further and the waveform of the oscillator is a pulse waveform. It is believed that when the leads on the resistors are very short, the distributed inductance they contribute may be close in value to the capacitance of the diode. Under these circumstances, it is believed that the circuit looks mainly like an LC resonant circuit and, therefore, the output oscillations are close to sine wave oscillations. It is also believed that as the lead inductance increases, the circuit looks more like an LR circuit rather than an LC circuit, so that the circuit produces pulses rather than a sine wave.

Practical circuits have been built using a resistor 84 with short leads which have produced output frequencies up to about 180 megacycles. Increasing the lead length decreased the output frequency to 10 megacycles and less. The lower limit of oscillation in circuits tested thus far was found to be in the hundred kilocycle region.

The means for sensing whether or not oscillations are present in the circuit of diode 46 is shown in FIG. 7 as an antenna 88 coupled to an amplifier 90. Preferably, only a single antenna 88 need be employed for all memory elements in a memory plane, as will be explained in further detail in connection with FIG. 9. Amplifier 90 is preferably a broad band amplifier since it must be capable of amplifying very short pulses of radio frequency energy. For high speed computer applications, amplifier 90 may be a traveling wave tube, parametric amplifier, or the like. For lower speed applications, more conventional amplifiers may be employed.

In the modification shown in FIG. 8, the read diode 46 is shunted by a second negative resistance diode 92. The second diode is connected back-to-back with the first and it acts like a resistor of relatively low impedance. Accordingly, the diode serves the same purpose as resistor 84 of FIG. 7. It must be remembered that the negative resistance diodes, unlike positive resistance diodes, are very highly doped and have a relatively low resistance in the back direction. In the circuit of FIG. 8, as in the one of FIG. 7, the inductance required for the oscillatory circuit is supplied by the distributed inductance introduced by the shunting element—diode 92. In this case, due to the construction of the diodes, the effective lead lengths can be made very short and the inductance therefore very low. Accordingly, higher oscillatory frequencies can be realized with the circuit of FIG. 8 than with the one of FIG. 7. Frequencies here may be of the order of 200–300 megacycles or more.

In the embodiments of the invention shown in FIGS. 3, 7 and 8, the write and read diodes are connected anode-to-anode through the isolator. In the embodiment of FIG. 9, storage and read diodes 34 and 46 are connected anode-to-cathode. The operation of the circuit is, however, very similar to that of the other circuits described. When the digit zero is written into storage diode 34, a relatively small value of reverse bial current is driven through read diode 46 by storage diode 34. When the digit one is written into storage diode 34, a much larger value of reverse bias current is driven through read diode 46. To read information by means of read diode 46, negative rather than positive pulses are applied through resistors 50 and 54. These apply a current through the diode in the forward direction. When storage diode 34 stores the digit zero, less additional current through resistors 50 and 54 is required to drive read diode 46 into its oscillating region than when storage diode 34 stores the digit one.

Figure 11:
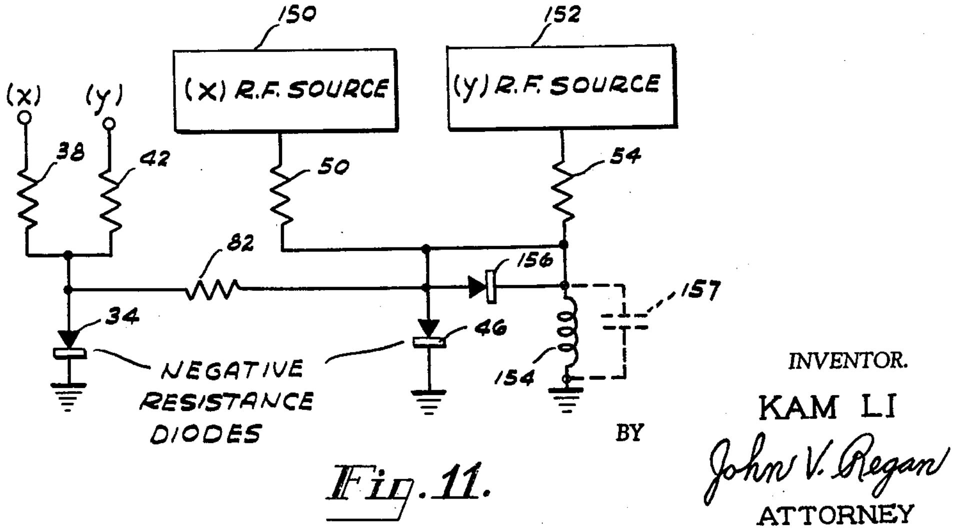
FIG. 11 is a block and schematic circuit diagram of another embodiment of the invention.

The embodiment of the invention shown in FIG. 11 employs D.C. pulses for writing information into storage diode 34 and R.F. pulses for read out. Elements similar in function to corresponding elements in FIG. 7 bear the same reference numerals. Sources 150 and 152 connected through coupling resistors 50 and 54 to the anode of negative resistance diode 46 are radio frequency sources. These may produce oscillations at frequency $2f$, for example. An inductor 154 is connected also to the anode of negative resistance diode 46 through a conventional diode 156. At the low values of voltages employed the forward resistance of diode 156 is substantial and the diode is therefore suitable as an isolating element. The inductor 154 has a distributed capacitance 157 associated with it and therefore acts as a resonant circuit.

In operation of the embodiment of FIG. 11, the radio-frequency pulses applied by sources 150 and 152, taken together, are of sufficient amplitude to drive diode 46 into its negative resistance region when storage diode 34 is in one state, for example, the high state but of insufficient amplitude to do so when storage diode 34 is in its other state—the low state. When the read diode 46 is driven into the negative resistance region, the resonant circuit consisting of the inductor 154 and its distributed capacitance 157 oscillates at the frequency to which it is tuned. The driving frequency applied by sources 150 and 152 may be at a frequency $2f$ and the resonant frequency of the inductor and its capacitor may be a frequency $f$, although this frequency relationship is not essential. For example, in another practical circuit, the driving signals from sources 150 and 152 may be of different frequencies $f_1$ and $f_2$ and the resonant circuit may be tuned to the beat frequency between frequencies $f_1$ and $f_2$ such as $f_1 - f_2$.

In all of the embodiments of the invention discussed, the read diode 46 is driven into its negative resistance region from its lower voltage positive resistance region. It should be appreciated that the circuit is also operative in a second mode with diode 46 normally forward biased to the higher voltage positive resistance region. In this second mode of operation, the read sources 48 and 52 apply reverse bias pulses having an amplitude together which is sufficient to drive diode 46 into its negative resistance region when storage diode 34 is in one state but not when it is in the other. This second mode of operation is ordinarily not as desirable as the one described in detail, since this second mode requires a quiescent D.C. bias current to be applied to read diode 46 and this application is ordinarily wasteful of power.

A practical circuit according to FIG. 3 may have circuit elements of the following values. It is to be understood that these values are merely illustrative of the invention and are not meant to be limiting.

Resistors 38 and 42—270 ohms each
Resistors 50 and 54—120 ohms each
Isolator 44—a resistor of about 20 to 50 ohms
Modifier and reactance 56—a resistor of about 3 to 10 ohms
Forward bias D.C. source—about 2 to 5 volts
Sources 36 and 40 producing D.C. pulses of about 3 volts each
Resistor 32—150 ohms In a practical circuit it is preferred to use a storage diode 34 having a higher current rating (higher ordinal value of point *b*) than the read diode 46. In this case there is less possibility that feedback from the tuned circuit during the read cycle will destroy the information stored in the write diode. Destructive readout could result if the feedback were of sufficiently high amplitude to drive the storage diode 34 sufficiently far into its negative resistance region.

Figure 10:
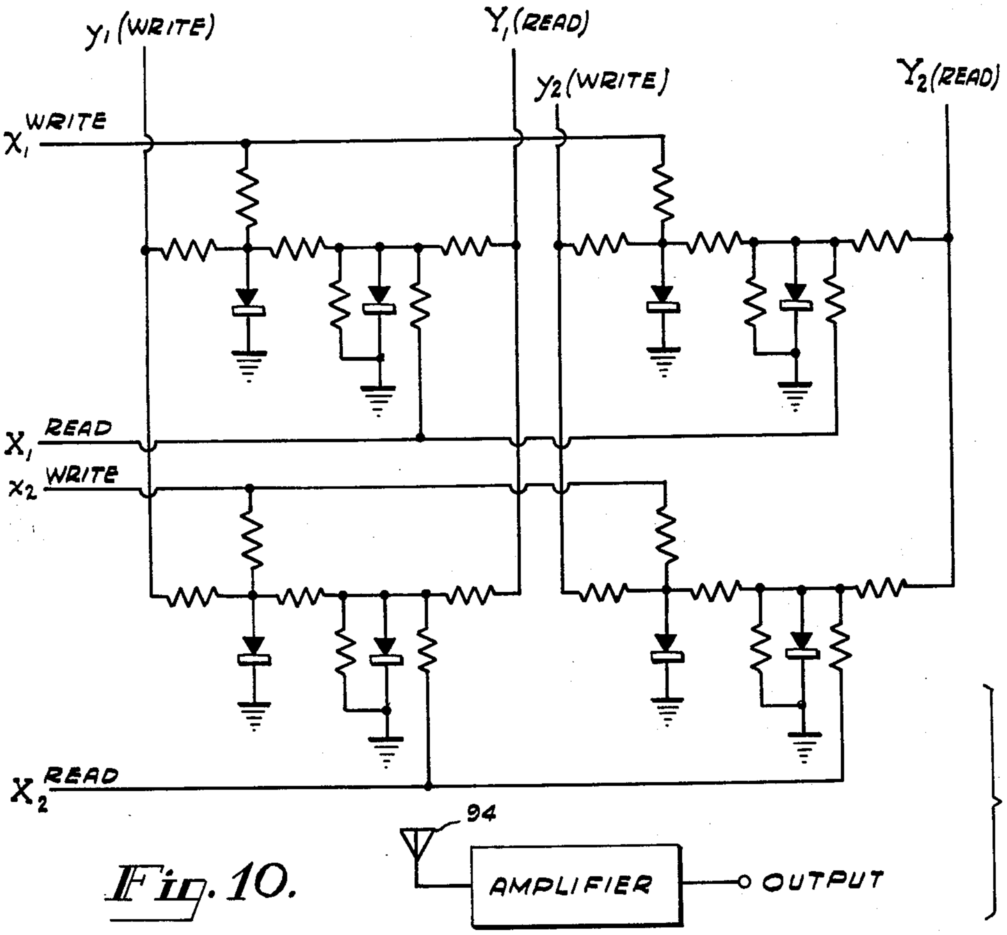
FIG. 10 is a block and schematic circuit diagram of a portion of a memory plane according to the present invention.

A memory plane according to the present invention is shown in FIG. 10. The one illustrated includes two each of *x* write leads, *y* write leads, X read leads and Y read leads, and four memory elements—four write diodes and four read diodes. It is to be understood that a practical computer may include many more of each of the elements above than are shown. It is also to be understood that a practical computer may include many memory planes. Preferably, a common antenna 94 is used for all memory elements in one memory plane and a different antenna is used for each memory plane. Antenna 94 may be located relatively far from the memory plane, that is, from 1 to 15 feet or so from the plane. However, for high speed applications, it is preferred to place the antenna close to the memory elements, that is, to place it within an inch or less from the plane of the diodes. In a practical circuit, the read and write buses may be formed of strip transmission lines, the resistors and other similar elements of printed circuits, and the antenna may also be of printed circuits.

The write and read sources are not shown in FIG. 10. In a preferred form of the invention, one each of *x* and *y* write sources and one each of *x* and *y* read sources would be employed for each memory plane. Switches (not shown) in FIG. 10 connect the read and write sources to the desired buses.

Some of the important advantages of the circuits described are:

(1) They operate at very high speeds.
(2) They have high signal-to-noise ratio.
(3) Direct-current pulses are used both for read and write.
(4) They are simple and compact.

What is claimed is:

1. In combination, a first negative resistance diode which is capable of assuming one of two stable voltage states; a second negative resistance diode which is capable of oscillating in response to an applied current of given magnitude; a connection between said first and second diode for applying one value of direct current to the second diode when the first diode is in one state and another value of direct current to the second diode when the first diode is in its other state; and means for applying an additional current to the second diode which, when added to the current applied from the first diode, places the second diode in an oscillating condition when the first diode is in one state but not when the first diode is in the other.

2. A circuit for sensing the voltage state of a first negative resistance diode comprising, in combination, a second negative resistance diode which can be made to oscillate in response to a current of one value but which will not oscillate in response to a current of another value; a direct current coupling circuit coupling said second diode to said first so that different currents flow through the second when the first is in different voltage states; and means for applying an additional current to the second diode which, when added to the current already flowing through the second diode, is sufficient to cause the second diode to oscillate when the first diode is in one state but not when the first diode is in its other state.

3. A circuit for sensing the voltage state of a first negative resistance diode comprising, in combination, a second negative resistance diode which can be made to oscillate in response to a current of one value but which will not oscillate in response to a current of another value; an isolating element connecting one electrode of the first diode to the corresponding electrode of the second diode for applying different direct currents to the second when the first is in different voltage states; and means for applying an additional current to the second diode which, when added to the current due to the state of the first diode, is sufficient to cause the second diode to oscillate when the first diode is in one state but not when the first diode is in the second state.

4. A circuit for sensing the voltage state of a first negative resistance diode comprising, in combination, a second negative resistance diode which can be made to oscillate in response to a current of one value but which will not oscillate in response to a current of another value; a coupling resistor connecting the anode of one diode to the cathode of the other diode and having a value such that the first diode causes different currents to flow through the second diode when the first diode is in different voltage states; and means for applying an additional current to the second diode which, when added to the current supplied due to the state of the first diode, is sufficient to cause the second diode to oscillate when the first diode is in one state but not when the first diode is in its other state.

5. A circuit for sensing the voltage state of a first negative resistance diode comprising, in combination, a second negative resistance diode and a resistor in shunt with said second diode of a value such that said second diode can be made to oscillate in response to a current of one value but not in response to a current of another value; a circuit coupling said second diode to said first for applying different direct currents to the second when the first is in different voltage states; and means for applying an additional current to the second diode which, when added to the current supplied by the first diode, is sufficient to cause the second diode to oscillate when the first diode is in one state but not when the first diode is in its second state.

6. A circuit for sensing the voltage state of a first negative resistance diode comprising, in combination, a second negative resistance diode which can be made to oscillate in response to a current of one value but which will not oscillate in response to a current of another value, said second negative resistance diode including a third negative resistance diode in shunt therewith; a circuit coupling said second diode to the first so that different currents flow through the second when the first is in said different voltage states; and means for applying an additional current to the second diode which, when added to the current supplied by the first diode, is sufficient to cause the second diode to oscillate when the first diode is in one state but not when the first diode is in its second state.

7. A circuit for sensing the voltage state of a first negative resistance diode comprising, in combination, a second negative resistance diode connected back-to-back with said first negative resistance diode which can be made to oscillate in response to a current of one value but which will not oscillate in response to a current of another value, said second negative resistance diode including an impedance in shunt therewith; and means for applying a current to said second diode which when added to the current supplied by the first diode is sufficient to cause the second diode to oscillate when the first diode is in a first state but not when the first diode is in its second state.

8. In combination, a first negative resistance diode; a second negative resistance diode; impedance means coupling said two diodes through which a direct current flows when the voltage across the first diode is greater than that across the second diode; and means for interrogating the second diode for determining the state of the first diode.

9. In combination, a storage negative resistance diode; a second negative resistance diode; an impedance means coupling said two diodes which permits the voltage across the storage diode to produce a flow of direct current through the second diode; and means for applying concurrent pulses to the second diode for ascertaining the state of the storage diode.

10. In combination, a storage negative resistance diode; a second negative resistance diode; a bidirectional impedance element directly coupling like elements of said two diodes which permits the voltage across the storage diode to produce a flow of current through the second diode; means for quiescently forward biasing said storage diode; means for writing information into said storage diode thereby causing it to assume its high or its low voltage state; and means for thereafter applying concurrent pulses in the forward direction to the second diode for producing an output signal in accordance with the state of the first diode.

11. In a network including an input terminal, an output terminal, and a common third terminal, in combination, a first negative resistance diode connected between said input terminal and said common third terminal; a second negative resistance diode connected between said output terminal and said common third terminal, like electrodes of said diodes being connected to said common third terminal; and a resistor directly connecting said input and output terminals having a value sufficiently small that the state of the first diode substantially affects the quiescent bias level of the second diode.

12. In combination, a storage tunnel diode; a second tunnel diode; a bidirectional impedance element directly coupling like elements of said two diodes which permits the voltage across the storage diode to produce a flow of current through the second diode; means for quiescently forward biasing said storage diode; means for writing information into said storage diode thereby causing it to assume its high or its low voltage state; and means for thereafter applying concurrent pulses in the forward direction to the second diode for producing an output signal in accordance with the state of the first diode.

13. In a network including an input terminal, an output terminal, and a common third terminal, in combination, a first negative resistance diode connected between said input terminal and said common third terminal; a second negative resistance diode connected between said output terminal and said common third terminal; and a resistor directly connecting said input and output terminals having a value sufficiently small that the state of the first diode substantially affects the quiescent bias level of the second diode.

14. In a network including an input terminal, an output terminal and a common third terminal, in combination, a first voltage controlled negative resistance diode connected between said input terminal and a common third terminal; a second voltage controlled negative resistance diode connected between said output terminal and said common third terminal; a substantially constant current source coupled to said diodes for supplying operating currents thereto and a direct current coupling element directly connecting said input and output terminals and having a value sufficiently small that the state of the first diode substantially affects the quiescent current passing through the second diode.

15. In a network including an input terminal, an output terminal, and a common third terminal, in combination, a first negative resistance diode connected between said input terminal and said common third terminal; a second negative resistance diode connected between said output terminal and said common third terminal, the anode of one of said diodes and the cathode of the other being connected to said common third terminal; and a resistor directly connecting said input and output terminals having a value sufficiently small that the state of the first diode substantially affects the quiescent bias level of the second diode.

16. In a network including an input terminal, an output terminal, and a common third terminal, in combination, a first tunnel diode connected between said input terminal and said common third terminal; a second tunnel diode connected between said output terminal and said common third terminal; and a direct current coupling element directly connecting said input and output terminals and having a value sufficiently small that the state of the first diode substantially affects the quiescent bias level of the second diode.

17. In a network including an input terminal, an output terminal and a common third terminal, in combination, a first voltage controlled negative resistance diode connected between said input terminal and said common third terminal; a second voltage controlled negative resistance diode connected between said output terminal and said common third terminal, said second diode having a lower current peak than said first diode; and a resistor directly connecting said input and output terminals having a value sufficiently small that the state of the first diode substantially affects the quiescent bias level of the second diode.

18. In combination, a first voltage controlled negative resistance diode; a second voltage controlled negative resistance diode connected across the first diode anode-to-cathode and serving as a load on the first diode; a substantially constant current source connected across said two diodes and supplying a quiescent current thereto at a level such that no oscillations are produced; and means for applying a signal to said diodes for causing said first diode to produce oscillations.

References Cited in the file of this patent

UNITED STATES PATENTS

| | | |
|---|---|---|
| 2,549,779 | Crenshaw | June 30, 1951 |
| 2,581,273 | Miller | Jan. 1, 1952 |
| 2,892,965 | Colwell | Apr. 24, 1959 |

FOREIGN PATENTS

| | | |
|---|---|---|
| 159,041 | Australia | Sept. 27, 1954 |

OTHER REFERENCES

"Introduction to the 4-layer diode" by Shockley and Gibbons, Semiconductor Products, Jan.-Feb. 1958.

"Tunnel Diode: Big Impact," Electronics, August 1959, page 61.